United States Patent [19]
Olcott, Jr.

[11] Patent Number: 4,550,478
[45] Date of Patent: Nov. 5, 1985

[54] TWO-PLY SPINNING COTS

[75] Inventor: Robert S. Olcott, Jr., Millersville, Pa.

[73] Assignee: Armstrong World Industries, Inc., Lancaster, Pa.

[21] Appl. No.: 290,013

[22] Filed: Aug. 4, 1981

[51] Int. Cl.[4] ............................................. B21B 27/02
[52] U.S. Cl. ........................................ 29/130; 29/132
[58] Field of Search ...................... 29/121.8, 130, 132, 29/129.5; 139/296

[56] References Cited
U.S. PATENT DOCUMENTS

| | | | |
|---|---|---|---|
| 2,304,656 | 12/1942 | Rockoff | 29/132 X |
| 2,804,678 | 9/1957 | Rockoff | 29/130 X |
| 3,152,387 | 10/1964 | MacLeod | 29/130 |
| 4,037,299 | 7/1977 | Smith | 29/130 |

FOREIGN PATENT DOCUMENTS 1268914  5/1968  Fed. Rep. of Germany .

Primary Examiner—Mark Rosenbaum
Attorney, Agent, or Firm—Laird F. Miller

[57] ABSTRACT

The present invention comprises a two-ply spinning cot having a relatively hard outer layer and a relatively soft inner layer. A two-ply cot constructed according to this invention will exhibit the resistance to lapping demonstrated by hard cots, yet will produce high quality yarn normally obtainable only by using soft cots.

4 Claims, 1 Drawing Figure

U.S. Patent  Nov. 5, 1985  4,550,478
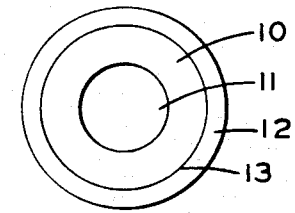

TWO-PLY SPINNING COTS

This invention relates to spinning cots and more particularly to two-ply spinning cots for use in the textile industry.

BACKGROUND OF THE INVENTION

Spinning cots were at one time conventionally made of leather and cork materials but, in recent years, these materials have gradually been replaced by synthetic rubber compositions.

Much research has been conducted to improve the nature of cots used in industry and many changes have been made in the types of materials used. Nevertheless, certain problems remain to be solved. For example, it is known that soft cots, that is, cots having a Shore A hardness of 65-75, will produce high quality yarn. However, soft cots tend to encourage lapping and they are not particularly durable; thus, they are not entirely satisfactory for textile industry use. Conversely, cots having a higher Shore A rating, for example 80 or more, will show greater durability. Nevertheless, they tend to produce lower quality yarn because there is less control of the individual fibers.

THE PRIOR ART

A variety of rollers, cots, and aprons are described in the art. West German patent application No. 268914 discloses an inner cellular elastic material which is toroidal in shape, wrapped with reinforcing string and covered with a relatively hard outer elastomeric material that is also toroidal in shape at the interface between the two surfaces. U.S. Pat. No. 1,810,636 discloses a textile roll with a textured outer surface to grip the fibers. U.S. Pat. No. 2,386,583 discloses a dispersion of ground rubber in a rubber matrix, the composite material having a Shore hardness of 50-95. U.S. Pat. No. 2,594,348 discloses a porous surfaced roller. U.S. Pat. No. 2,729,860 discloses spinning elements comprising surfactants which assist in avoiding lapping. U.S. Pat. No. 2,748,428 discloses a condenser apron comprising an outer rubber layer and an inner leather layer. U.S. Pat. No. 3,490,119 discloses a roll having an inner fiber layer and an outer polyurethane surface. U.S. Pat. No. 3,571,878 discloses a complex industrial roll comprising a ridged urethane foam, and a skin comprising a filled polyester resin. Nevertheless, none of these references either teach or suggest how to combine soft and hard materials into a unitary spinning cot which will produce superior quality yarn.

Accordingly, one objective of the present invention is to prepare cots which will be useful to prepare uniform, high quality yarn.

A second objective of the present invention is to provide cots having a durable outer surface, yet which will permit greater deflection under load than is generally permissible, thus reducing the distance between the front roll and the apron nip of a spinning frame.

Yet another objective of the present invention is to provide a two-ply cot which will have high durability yet which will minimize lapping of the fibers.

These and other objectives will become apparent from the detailed description of preferred embodiments which follow.

SUMMARY OF THE INVENTION

The present invention comprises a two-ply spinning cot having a relatively hard outer layer and a relatively soft inner layer. A two-ply cot constructed according to this invention will exhibit the resistance to lapping demonstrated by hard cots, yet will produce high quality yarn normally obtainable only by using soft cots.

BRIEF DESCRIPTION OF THE DRAWING

The FIGURE illustrates an end view of a spinning cot constructed according to the present invention.

DETAILED DESCRIPTION OF PREFERRED EMBODIMENTS

The present invention comprises a two-ply spinning cot for mounting on an arbor of a spinning frame. The spinning cot is comprised of an inner layer comprising a resilient rubber composition, said inner layer having a hole disposed approximately axially through the center thereof to receive said arbor, and having a Shore A hardness of from about 50-70. The cot also comprises an outer layer comprising a butadiene-acrylonitrile rubber composition, said outer layer being bonded to said inner layer and having a Shore A hardness of from about 70 to 85. The inner layer comprises from about $\frac{3}{4}$ to $\frac{1}{3}$ of the total thickness of said inner and outer layers, and the outer layer comprises from about $\frac{1}{4}$ to $\frac{2}{3}$ of said total thickness.

It is well-known in the art that soft cots produce superior quality yarn because greater control of the yarn fibers is possible using the relatively soft surface; however, soft cots tend to encourage lapping of the yarn. Accordingly, the industry generally favors using cots having a relatively high Shore A hardness rather than soft cots.

Surprisingly, we have discovered that if two-ply cots are constructed having a relatively soft inner layer and a relatively hard outer layer, the relatively soft inner layer allows the outer layer to deflect, thus providing greater control of the yarn fibers. Nevertheless, the relatively hard outer surface tends to diminish the likelihood of lapping. As a result, a very high quality yarn is obtained.

A typical cot constructed according to the present invention is illustrated in the figure. The relatively soft inner layer 10 has a hole 11 disposed approximately centrally therethrough, hole 11 being of sufficient size to receive an arbor of a spinning frame. Although the diameter of hole 11 may be varied depending on the arbor which is used, generally arbors having diameters of $\frac{3}{8}$" to $1\frac{1}{8}$" are encountered in the industry. Disposed about inner layer 10 is outer layer 12 which is bonded to inner layer 10 approximately along line of demarcation 13.

The relative thicknesses of inner layer 10 and outer layer 12 may be varied according to its intended use. However, it is preferred that inner layer 10 comprise about $\frac{3}{4}$ to $\frac{1}{3}$ of the total thickness of said inner layer 10 and outer layer 12, and that outer layer 12 comprise from about $\frac{1}{4}$ to $\frac{2}{3}$ of said total thickness. More preferably inner layer 10 will comprise $\frac{3}{4}$ to $\frac{1}{2}$ of the total thickness and outer layer 12 will comprise $\frac{1}{4}$ to $\frac{1}{2}$ of the total thickness.

Inner layer 10 may be constructed of virtually any suitable resilient material having a Shore A hardness as set forth below, said materials being well known in the art. Preferably a butadiene-acrylonitrile rubber composition will be employed. Layer 10 will preferably have a Shore A hardness of from about 50 to 70, but more preferably the Shore A hardness will be from about 55 to 65.

Outer layer 12 will preferably be constructed of a butadiene-acrylonitrile rubber composition having a Shore A hardness of about 70 to 85, but more preferably the Shore A hardness will be about 75 to 85. Examples of suitable compositions for constructing outer layer 12 may be found in U.S. Pat. No. 2,811,752.

Any suitable adhesive may be employed to adhere outer layer 12 to inner layer 10, the only restriction being that the adhesive be compatible with the respective materials. An example of a suitable adhesive is Chemlok 234 which is available from Hughson Chemical Division of Lord Manufacturing Co.

Usually the relative thickness of each layer will be selected based on the relative Shore A hardness of each layer. For example, if the Shore A hardness of the inner layer is relatively low, a relatively less thick inner layer will be required to achieve suitable deflection of the outer surface. Conversely, if a relatively high Shore A hardness is selected for the inner layer, a relatively thicker inner layer will be required to achieve a suitable deflection.

The following example will illustrate a preferred embodiment of the present invention.

EXAMPLE

A two-ply spinning cot for mounting on a 7/8" diameter arbor is produced by blending the following components which will have a cured Shore A hardness of 50.

| Ingredient | Parts by Weight |
| --- | --- |
| Medium acrylonitrile butadiene-acrylonitrile copolymer | 100 |
| Antioxidant | 2 |
| Pigment | 1 |
| Clay reinforcing agent | 10 |
| Silica-type reinforcing agent | 25 |
| Plasticizer | 20 |
| Titanium dioxide | 10 |
| Vulcanized vegetable oil extender | 35 |
| Sulfur | 2.5 |
| Zinc Oxide | 5 |
| Vulcanization accelerator | 2 |

The blended material is extruded or otherwise formed and mounted on a mandrel having a diameter of 0.8126". The extruded composition is wrapped with tape in standard fashion to form the composition to the mandrel and the taped material is vulcanized in an autoclave by means well known in the art for 50 minutes at 305° F. The tube of vulcanized material is removed from the mandrel and remounted on a mandrel having a diameter slightly larger than 0.8126". The surface of the vulcanized tube is ground by means well known in the art to provide a tube having an outside diameter of $1\frac{1}{8}"$ when mounted on a $\frac{7}{8}"$ arbor. When so mounted on the $\frac{7}{8}"$ arbor, the ground material has a wall thickness of approximately $\frac{1}{8}"$. The ground material is then coated with Chemlok 234 Adhesive, which is allowed to dry.

A second material having a cured Shore A hardness of 80 is prepared by extruding or otherwise forming an appropriate composition as set forth in U.S. Pat. No. 2,811,752 to an approximate inside diameter of 1.06", with an approximate wall thickness of 5/32". The previously cured 55 Shore A material is remounted on a mandrel having a diameter of 0.8125" and the 80 Shore A tube is assembled over the mounted 55 Shore A tube by means well known in the art. The two-ply tube is then wrapped and vulcanized as described above.

The resulting two-ply tube is removed from the mandrel and cut into lengths of approximately 1 5/16", an appropriate length for a spinning cot. Each cot is mounted on a $\frac{7}{8}"$ arbor and buffed to an initial operating diameter of 1 5/16". The two-ply cot is 1/16" smaller in diameter than the actual diameter ($\frac{7}{8}"$) of the arbor on which it will be mounted in order to provide hoop stress to keep the cot in place. The 55 Shore A inner layer comprises 57% of the total wall thickness of the cot, and the 80 Shore A outer layer comprises about 43% of the total thickness.

My invention is not restricted solely to the descriptions and illustration provided above, but comprises all modifications envisaged by the following claims.

I claim:

1. A two-ply spinning cot for mounting on an arbor of a spinning frame said cot comprising:

an inner layer comprising a resilient rubber composition, said inner layer having a hole disposed approximately axially through the center thereof to receive said arbor and having a Shore A hardness of from about 50 to 70, and an outer layer comprising a butadiene-acrylonitrile rubber composition, said outer layer being bonded to said inner layer and having a Shore A hardness of from about 70 to 85, said inner layer comprising from about $\frac{3}{4}$ to $\frac{1}{3}$ of the total thickness of said inner and outer layers, and said outer layer comprising from about $\frac{1}{4}$ to $\frac{2}{3}$ of said total thickness, said inner and outer layers having different Shore A hardness values.

2. The invention as set forth in claim 1 wherein said hole is of suitable size to receive an arbor comprising a diameter of from $\frac{3}{8}"$ to $1\frac{1}{8}"$.

3. The invention as set forth in claim 2 wherein said inner layer comprises about $\frac{3}{4}$ to $\frac{1}{2}$ of the total wall thickness and said outer layer comprises about $\frac{1}{4}$ to $\frac{1}{2}$ of said total thickness.

4. The invention as set forth in claim 2 wherein said inner layer has a Shore A hardness of from about 55 to 65 and said outer layer has a Shore A hardness of from about 75 to 85.

* * * * *